Patented May 8, 1951

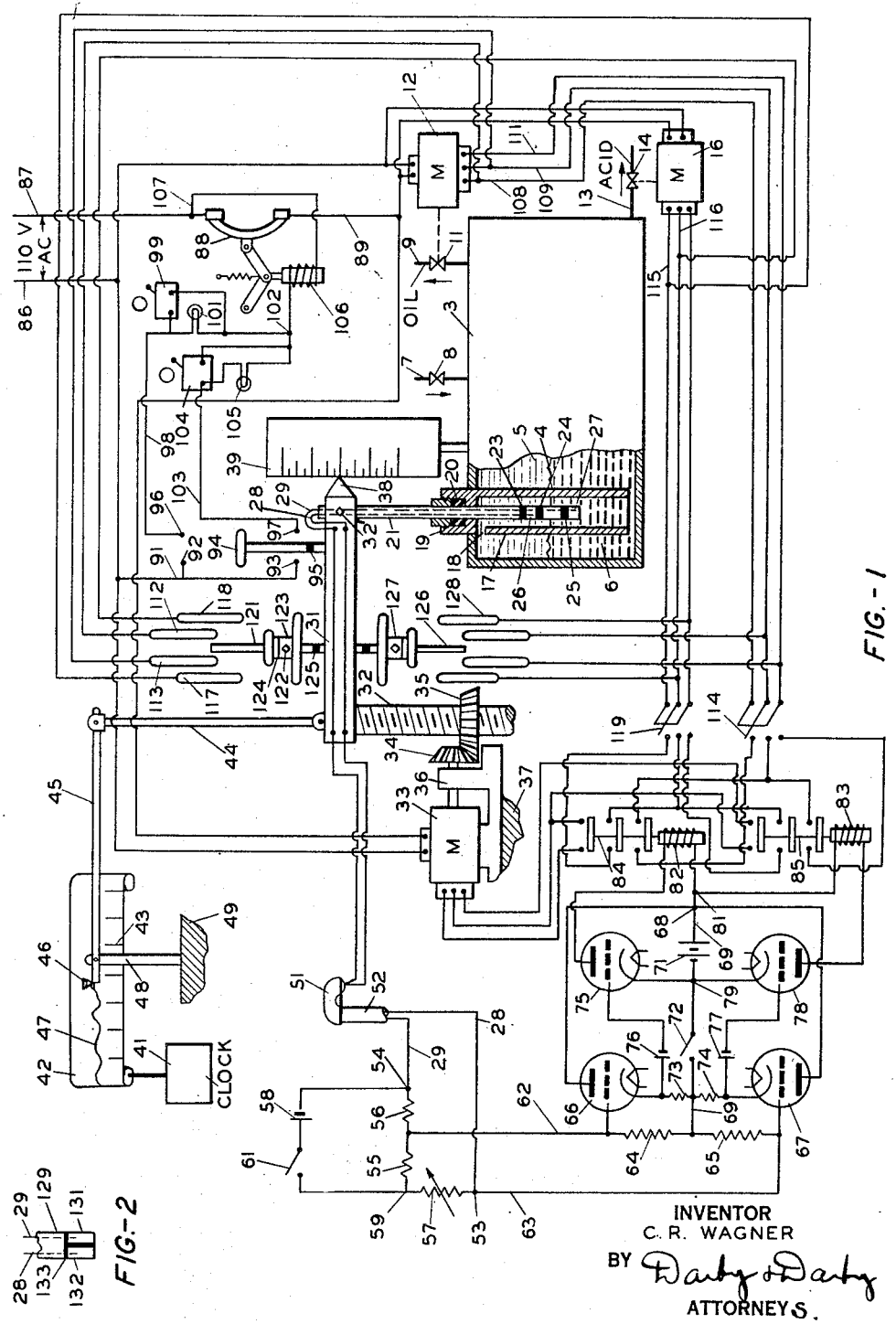

2,551,983

UNITED STATES PATENT OFFICE 2,551,983

LEVEL INDICATOR OF INTERFACE BETWEEN ACID AND HYDROCARBON LAYERS

Cary R. Wagner, Utica, Ohio, assignor to Phillips Petroleum Company, a corporation of Delaware Original application May 19, 1944, Serial No. 536,356. Divided and this application July 24, 1945, Serial No. 606,869

2 Claims. (Cl. 73—304)

This application is a division of my copending application Serial No. 536,356, filed May 19, 1944 now patent No. 2,394,220, issued February 5, 1946.

This invention relates to a control system for indicating and/or recording the elevation of the interface between two substantially immiscible fluids of different specific gravities and different specific resistivities and is particularly adapted to be applied to tanks or other containers.

This invention relates particularly to the measurement of the elevation of the interface between a corrosive substance such as hydrofluoric acid and some other substance such as hydrocarbon oils, and it finds particular relation to the alkylation of hydrocarbons by hydrofluoric acid.

This invention relates also to the provision of suitable means including a dynamic cathode relay control, various contacting and circuit breaking means, the use of shading coil reversible motors and recording and indicating means in relation to such a liquid level indicator and recorder.

In the alkylation of hydrocarbons by hydrofluoric acid a problem occurs in the separation of the two fluids in the separating tank, in that it is very hard to determine, and record the elevation of the interface between the fluids. The hydrofluoric acid is very corrosive and dangerous to human beings and so the use of trycocks is both messy and dangerous. The use of a float and connecting linkage is very unsatisfactory because the acid will corrode the float and render the linkage inoperative and the difference in specific gravity between the two fluids is often not great enough to give very much power to the float. The use of a gauge glass is of course impossible as the hydrofluoric acid attacks the glass. In fact, hydrofluoric acid will attack almost any transparent medium of which a gauge glass could be commercially constructed.

It is very important, however, to know where the interface is in the tank so as to allow proper separation. In the middle portion of the tank, the tank being generally cylindrical, there is more area provided for separation at the interface than when the interface is too high or too low. Also when the interface is too near an exit for one fluid some of the other fluid may pass out the exit, which is bad. Since the interface between the two liquids is always somewhat indefinite as one separates out of the other it is evident that the solution of this problem requires invention. The mixture of acid and hydrocarbon may vary in content but the interface should be maintained in the central portion of the tank; and the separated acid and hydrocarbon should be removed continually from portions of the tank in which they have accumulated.

One object of the present invention is to provide an accurate indicator of the elevation of the interface between two substantially immiscible fluids of different specific gravities and different specific electrical resistivities which will not be affected by the corrosive or other deleterious nature of the substances and which will continue to operate over a long period of time.

Another object is to provide a recorder in combination with such an indicator.

Another object is to provide automatic and positive operating means employing electronic circuits and relays, suitable motors and other suitable equipment to give smoothness and certainty of operation of such a device.

Another object is to only use low voltage near the hydrocarbon.

A further object is to provide a level indicator.

Numerous other objects and advantages will be apparent to those skilled in the art upon reading the accompanying specification and claims and studying the accompanying drawings.

In the drawings:

Figure 1 is a diagrammatic elevation of an illustrative embodiment of the invention with a wiring diagram of the electrical equipment employed therein; and Figure 2 is an elevational view with parts broken away of a second type of electrode which may be employed in place of the type shown in Figure 1.

While the invention will be described in relation to a particular specific application thereof, it will be seen that the invention is not limited thereto, and that while the fluids described will be hydrocarbon oil and hydrofluoric acid it will be obvious that any two substantially immiscible fluids of different specific gravity and different specific electrical resistivities are suitable for the practice of the invention. The better conducting liquid may be above or below the less electrically conducting one, and while oil has a high resistance and hydrofluoric acid a fairly low resistance it is possible to apply the invention to two fluids the resistances of which are much closer together than that of hydrocarbon oil and hydrofluoric acid. While a tank 3 is shown it is obvious the invention could be applied to a pond or river on which a layer of material having different specific resistivity may be floating.

Figure 1 therefore shows the invention as applied to the specific problem of indicating and recording the level in tank 3 of interface 4 between a hydrocarbon oil 5 and hydrofluoric acid 6. A mixture of the oil and acid comes from an alkylator (not shown) through line 7 which may be provided with manually operated control valve 8. The oil 5 and acid 6 having different specific gravities and not having any physical affinity for each other immediately begin separating, the oil 5 being shown as rising to the top and the acid 6 as dropping to the bottom. The oil 5 is taken off through pipeline 9 which is shown on the top of the tank but which can be located in the side of the tank adjacent the top. Flow through line 9 is controlled by valve 11 which is operated by a motor 12. Acid 6 is drained from the bottom of tank 3 through line 13 controlled by valve 14 operated by motor 16.

Interface 4, is somewhat turbulent due to the stream of mixed liquids coming in from line 7 and in the case of hydrocarbon oils and hydrofluoric acid the interface is somewhat "fuzzy," that is at the interface there is a considerable extent of what might be termed an emulsion grading from pure oil at the top to pure acid at the bottom. While the invention is able to operate under such conditions, it is believed better to provide a stilling chamber, which is shown as a tube 17 not quite touching the bottom of the tank and provided with a small hole 18 adjacent its upper end. Obviously, the liquids inside the stilling chamber will have more opportunity to separate and the interface will not be as "fuzzy" and will not contain waves of the magnitude of those occurring in the tank 3. However, by locating the invention in a remote portion of a tank it is not necessary to have stilling chamber 17 and therefore the invention is not limited thereto. In some instances it is useful to provide a stuffing box 19 containing the usual packing 20 but in many instances no stuffing box is necessary as the invention can operate through an open hole. In the present embodiment I prefer to employ a stuffing box in which 20 is some suitable synthetic packing material not affected by hydrocarbons.

In the illustrative embodiment of the invention shown a probing element 21 is provided preferably in the form of a cylindrical rod, which like tank 3 is made with a surface that is non-corrosive. Element 21 may be made of several separable parts one of which comprises an interface sensing section which contains electrical insulating rings 23, 24 and 25 of some materials such as synthetic rubber which will not be affected by the hydrofluoric acid and which will not conduct electricity. Rings 23, 24 and 25 provide spaced electrodes 26 and 27 and electrodes 26 and 27 are connected respectively to wires 28 and 29 for purposes to be explained later.

In order to move the probing element 21 in a vertical direction so that the control section consisting of electrodes 26 and 27 may be positioned at the desired elevation relative to interface 4, an arm 31 which may be connected to it by set screw 32' is provided. Arm 31 is rigidly connected to a motion producing screw 32, and vertical movement of element 21, arm 31 and screw 32 is provided by motor 33 which drives pinion 34 which in turn drives pinion 35. Pinion 35 is screw threaded on screw 32, and a motor base 36 which is mounted on a frame 37 holds the pinions together. Frame 37 is rigid relative to tank 3.

An indicating pointer 38 is provided on arm 31 and a scale 39 may be mounted on tank 3 as one easy method of indicating the elevation of pointer 38 and thereby the elevation of the lower control section of probing element 21.

A recording system may be provided in the form of clock 41 driving paper 42 which may be marked with time interval marks 43. Any suitable linkage 44 and 45 may be provided to move inking apparatus 46 a reduced but proportionate distance across paper 42 as arm 31 rises and falls producing a record line 47 relative to time marks 43 and the linkage 45 may be supported by arm 48 mounted on a base 49. Base 49, like base 37, is rigid relative to tank 3.

In order to actuate motors 12, 16 and 33 in a proper manner at the proper time and for other purposes to be set forth an electrical system is provided. The electrical system may be subdivided into a power supply, a dynamic cathode relay control, a set of vertical movement actuated controls, and a vertical movement actuated circuit breaking and alarm system.

The dynamic cathode relay control will be described first. Wires 28 and 29 after leaving arm 31 are allowed to hang freely with considerable slack and may then pass into the usual conduit head 51 and through a conduit 52. While the entire system is preferably housed in suitable conduits and covered boxes (not shown) for the purposes of clarity the system is represented entirely by a wiring diagram. Wires 28 and 29 are connected to a bridge network at points 53 and 54 respectively.

The bridge network consists of fixed resistances 55 and 56 forming one side of the bridge and variable resistances 57 and the resistance between electrodes 26 and 27 to which wires 28 and 29 lead, forming the other side of the bridge. A battery 58 is provided for energizing the opposite ends 54 and 59 of the bridge and a knife switch 61 may be provided to open the circuit when the bridge is not in operation.

Wires 62 and 63 lead from the midpoints of opposite sides of the bridge down to the dynamic cathode relay proper and wires 62 and 63 are connected together through resistances 64 and 65. Wire 62 leads to the grid of triode 66 and wire 63 leads to the grid of triode 67. The plates of triodes 66 and 67 are connected together at 68 which point is also connected to central wire 69 containing battery 71 and knife switch 72. Switch 72 is opened when the relay is not being used. Central wire 69 also connects to resistances 64, 65, 73 and 74 as shown. The top of resistance 73 is tied to the cathode of tube 66 and to the grid of triode 75 through battery 76. Similarly the lower end of resistance 74 is tied to the cathode of triode 67 and also through battery 77 to the grid of triode 78. The cathode of triodes 75 and 78 are connected to central wire 69 at point 79 and to each other.

The plates of tubes 75 and 78 are connected together and to wire 69 at junction 81; and between the plate of 75 and junction 81 is solenoid relay coil 82 while similarly located between the plate of triode 78 and junction 81 is solenoid relay coil 83.

Solenoid 82 closes a multiple switching device 84 in response to plate to cathode current in tube 75 and switch 84 opens by gravity when this current ceases. Solenoid 83 operates multiple switch 85 in a similar manner in response to plate current in tube 78.

The power supply system comprises wires 86 and 87 which may carry any available commercial current such as 110 or 220 volts A. C. Wire 86 is easily traced to one of the power connections on each of motors 12, 16 and 33. Wire 87 passes through the circuit breaker 88 and continues as wire 89 which is easily traced to the other power terminal of motors 12, 16 and 33. Motors 12, 16 and 33 are shown as shading coil motors and their operation will be explained below.

The vertical movement actuated circuit breaking and alarm system will now be described. Wire 91 is attached to power wire 86 and is provided with contact elements 92, 93. Mounted on top of arm 31 is a contacting arm 94 which is insulated from arm 31 by rubber section 95. Upon extreme upper travel of arm 31 contact 94 will connect contactor 92 and contact 96 while upon extreme downward movement 94 will connect contact 93 and contact 97. Contacts 92 and 96, are at the same elevation but may be adjustably set at any predetermined common elevation and the same is true of contacts 93 and 97.

Contact 96 connects to wire 98 which contains electric bell 99 and electric light 101 in parallel therein, line 98 extending to junction 102. Contact 97 connects to wire 103 which has bell 104 and light 105 in parallel therein and which also connects at junction 102. Bell 99 is preferably chosen to have an entirely different tone than bell 104 so that its sound may be distinguished easily by the operator and light 101 may be a blue light while light 105 may be red so that they may be easily distinguished by the operator.

From junction 102 current passes through circuit breaker operating solenoid 106 and wire 107 to the opposite power wire 87 thus completing the circuit.

The vertical movement actuated control for the shading coil reversible motors 12 and 16 will now be described. The shading coil reversible motor is well known in the art and such a motor 12 is provided with a coil around a portion of the stator pole the ends of the coil leading to wires 108 and 109. A similar coil is provided around another portion of the stator pole and the ends of this coil are connected to wires 109 and 111. Motors 16 and 33 are similarly equipped. When wires 108 and 109 of motor 12 are shorted the back E. M. F. in the shorted coil shifts the stator magnetic field and motor 12 rotates in one direction; provided of course that current from wires 86 and 87 is being supplied to the motor. If wires 108 and 109 are not connected and wires 109 and 111 are shorted the other shading coil is shorted and the stator magnetic field shifts in the other direction causing rotation of the motor in the reverse direction. If wires 108, 109 and 111 are all connected together the motor does not turn but merely warms up a bit. The motor may be constructed with suitable electrical characteristics so that this warming up is not deleterious and the motor merely waits until the circuit between wires 108 and 109 or that between 109 and 111 is opened.

Wires 108 and 109 may be traced to contacts 112 and 113 respectively and also to triple pole single throw switch 114 for purposes to be described later. Wires 115 and 116 of motor 16 may also be traced to contacts 117 and 118 respectively and to triple pole single throw switch 119 which switch will be described later.

Arm 31 has rod 121 mounted on the upper side thereof and slidably secured in an adjustable position on rod 121 by means of set screw 122 is a body 123 having upper and lower contact arms separated by insulator 124. Rod 121 contains an electrical insulator 125. Depending upon the position at which 123 is adjusted on rod 121 a certain amount of upward movement of arm 131 will cause the two contacting arms on body 123 to connect contacts 117 and 118 and 113 and 112 respectively. Connecting contacts 112 and 113 will operate motor 12 to close valve 11 while contacting contactors 117 and 118 through the arm of body 123 will short the proper shading coil in motor 16 to open valve 14.

Rod 126 on the bottom of arm 31 has a body 127 adjustably mounted thereon and engageable with lower contacts such as 128 in the same manner as body 123 engages upper contacts 112, 113, 117 and 118. By tracing them out it will be seen that the lower contacts such as 128 will short the opposite shading coils in motors 12 and 16 and cause motor 12 to open valve 11 and motor 16 to close valve 14.

The dynamic cathode relay in operating switches 84 and 85 with switches 114 and 119 open will similarly short the shading coils of motor 33 causing motor 33 to raise or lower screw 32 and when switches 114 and 119 are closed switches 84 and 85 will also short the desired shading coils in motors 12 and 16 to operate them in the proper manner. If both shading coils of a motor should be shorted at the same time no harm is done as the motor merely warms up a little and waits with its rotor stationary for a change in the situation.

Figure 2 shows a probing rod 129 similar to rod 21 except that the control section consists of two electrodes 131 and 132 which are at the same elevation but which are separated from each other by T-shaped insulating material 133. In this modification wires 28 and 29 are connected respectively to electrodes 132 and 131.

*Operation*

Starting out with the acid 6 and hydrocarbon 5 each occupying half of tank 3 and with the interface 4, probing arm 21, and other elements all as shown in Figure 1 and with switches 61, 72, 114 and 119 closed, the operation of the device is as follows:

Suppose the percent of acid in the mixture of oil and acid coming in line 7 should increase. Then with the present flow of oil out valve 11, and acid out valve 14, the acid will begin to build up in the tank and interface 4 will rise. As acid is a better electrical conductor than oil the resistance between electrodes 26 and 27 will go down and this will unbalance the bridge circuit. Resistance 57 will take most of the voltage drop between points 59 and 54 while resistances 56 and 55 will continue to divide the voltage drop as before.

This will make wire 62 become positive relative to wire 63 and a positive charge will overcome the negative bias on the grid of triode 66, which negative bias is caused by the voltage drop through resistance 64 fed by battery 71. The grid of triode 67, however, goes still more negative so there is no opportunity for plate to cathode current in triode 67. When the grid of tube 66 is made positive enough by current from 62 building up a voltage across resistance 64 tube 66 becomes conducting and current flows from the plate to the cathode building up a positive voltage at the top of resistance 73.

This positive voltage at the top of resistance 73 overcomes the E. M. F. of battery 76 and causes the grid of tube 75 to go positive enough to make tube 75 conduct plate to cathode current. The plate to cathode current of tube 75 is preferably much larger than the plate to cathode current in tube 66 and this is known as amplification. The plate to cathode current in tube 75 passes through battery 71 and solenoid coil 82 raising switch 84 so that its three arms will connect the three sets of contacts, each arm connecting the two contacts shown directly above it. There being no current in coil 83 switch 85 remains open.

When switch 84 closes its contacts it is easily seen by tracing circuits that motor 33 has its upper shading coil shorted and immediately commences raising screw 32, arm 31 and rod 21 out of the acid until the resistance between electrodes 26 and 27 is the same as it originally was. This raising movement moves indicator 38 up relative to scale 39 so that the new level of the interface is indicated and rod 44 is also raised lowering ink pen 46 and making a record of the new position of the interface on paper 42 which is being driven slowly by clock 41.

Switch 114 and 119 being closed motor 12 is actuated by switch 84 to close valve 11 a little bit and motor 16 is actuated to open valve 14 a similar amount. This tends to take the acid out a little faster than the hydrocarbon and to bring the interface back toward its original position; or if the percentage of acid is still increasing to reduce the travel of the interface toward the top of the tank.

If switches 114 and 119 are open then switches 84 and 85 will only control motor 33 and will have no effect on motors 12 and 16. However, regardless of whether switches 114 and 119 are open or closed if the interface 4 continues to rise arm 31 will also continue to rise and, if the body 123 is properly adjusted, at a certain point in the rise of arm 31 contact 112 will be connected to contact 113 and contact 117 to contact 118. This will immediately cause motor 12 to close valve 11 and motor 16 to open valve 14, which action will tend to stop the progress of the interface toward the top of the tank. While valves 11 and 14 could be closed completely, I prefer to have their closed position such that a small amount of flow will still continue so that a warning may be given in the following manner. While contacts 112, 113, 117 and 118 may be positioned to be connected at the same moment that contacts 92 and 96 are connected it is preferred to have these contacts connected before contacts 92 and 96 are reached by arm 94. If the interface 4 continues, in spite of the controls provided, to the top of tank 3 (as would be the case if only acid were coming in line 7) then finally bar 94 connects contacts 92 and 96. Current from wire 86 then passes through wire 91, 92, bar 94, contact 96, wire 98 and rings bell 99 which has a tone of high pitch and lights blue light 101 passing through coil 106 and wire 107 to wire 87 the current opens circuit breaker 88 and makes all the motors inoperative.

The operator recognizing the color of light 101 and/or the tone of bell 99, knowns that the acid has taken over the tank completely and he thereupon starts taking whatever corrective measures he deems proper without having to go to the tank or look at scale 39 or record 47 to see what to do. If the acid were low the light actuated would be red light 105 and the bell would be low toned bell 104 and the operator could take proper steps in such instances. While contacts 92 and 96 are shown in such a position that the tank would be completely full of acid before the alarm sounded obviously they may be positioned so that they will be contacted and the alarm will sound when the interface 4 reaches any desired elevation in which case a margin of safety may be provided.

Starting again with the apparatus and interface as shown in Figure 1 and with switches 61, 72, 114 and 119 closed if the interface should fall exactly the opposite things will happen as described above when the interface rose. The falling of the interface increases the resistance between electrodes 26 and 27 and the voltage drop across resistance 57 becomes low making wire 63 go positive relative to wire 62. In a similar but reverse manner to that explained above tubes 67 and 78 now become conducting and switch 85 is closed while switch 84 remains open.

Motor 33 immediately begins to bring arm 31 down, motor 12 opens valve 11 and motor 16 closes valve 14. Enough travel of arm 31 will operate the lower contacts 128, 93 and 97 in a similar manner as the upper contacts were operated as described above.

In many installations valve 8 may be omitted and also in many installations valve 11 and motor 12 may be eliminated along with the contacts and wires of motor 12, because the operations of motor 16 and valve 14 will be found sufficient to control the elevation of interface 4.

Switches 114 and 119 may be opened and contacts such as 112, 117 and 118 may be relied upon entirely. Motors 12 and 16 may be eliminated, and valves 11 and 14 manually operated in which case the dynamic cathode relay merely operates motor 33 to indicate the level of the interface 4. This is especially true in applications to a pool or stream in which case there is no tank 3. Obviously, the device would operate without making record 47, as arm 44 may be detached.

If the interface 4 between the two fluids is of sufficient width and varies in electrical resistivity according to elevation then the electrode of Figure 2 may be employed in which case the resistance between electrodes 131 and 132 is applied to the bridge circuit in the same manner as the resistance between electrodes 26 and 27 as described above. While a specific embodiment employing hydrofluoric acid and hydrocarbon liquid has been described it is obvious that the two fluids may be changed as long as they are not miscible, have different specific resistivity and will separate under the influence of gravity. Either the upper or the lower may be more conductive of electricity than the other.

The dynamic cathode relay shown enables a very low voltage of battery 58 to be applied to electrodes 26 and 27. This is important because the voltage is too low to cause sparks or set things on fire. The hydrocarbons being often in the gasoline range, this prevention of fires is important. The various switches can be located in explosion proof boxes known to the electrical trade, but electrodes 26 and 27 have to contact the hydrocarbon.

Hydrocarbons have a high resistance, and the resistance of substantially anhydrous hydrofluoric acid, or of mixtures of oil and anhydrous acid, is not particularly low. So generally higher voltage electricity would have to be employed to pass enough current between the electrodes to operate relays directly. In so far as the general combination claimed, my invention can be practiced using high tension electricity and relays of the magnetic solenoid type, but it is preferred to use indirectly controlled relays, low electrode voltage, and amplification means to produce the relay operating currents. This preference diminishes in importance when the fluids are not inflammable, or subject to deleterious electrolysis.

The elements 55, 56 and 57 can be chosen of such size to position electrodes 26 and 27 at any desired normal elevation relative to the interface, and when Figure 2 is used in a variable content deep interface to place electrodes 131 and 132 at the desired elevation therein.

For adjustment of the normal elevation of the electrodes, resistance 57 is made variable and thus adjustment of elevation may be made without tearing the device down to replace resistances.

It is desirable to avoid "hunting," or continuous operation of the motors. To avoid such continual raising and lowering of 31 it is necessary to have a lag in the operation so that 31 may be somewhat lower, or higher, than normal before the device automatically moves it to normal position. In order to provide this lag and avoid "hunting" it is only necessary to choose the right values for resistances 64, 65, 73 and 74, the right type of tubes 66, 67, 75 and 78 and the right size batteries 71 and 76. This selection of sizes and types is well within the skill of the ordinary electrical engineer, or radio repair man. Any desired lag can thus be selected, depending entirely on what lag appears to be desirable. Battery 71 puts a negative bias on the grids of tubes 66 and 67 biasing the tubes to cut-off while battery 76 does the same for tube 75 and battery 77 for tube 78. These negative biases must be overcome before the respective tubes will conduct by an extent depending on the tube characteristics which may be found in any electronic or radio tube manual. These biases are respectively overcome by voltages developed across resistances 64 and 65 by battery 58 and by voltage drops across resistances 73 and 74 developed by plate current in tubes 66 and 67 respectively.

Many changes of circuits following the standard circuits old in the art, and many substitutions of tubes or conventional elements having the same function may be done by those skilled in the art the scope of my invention being set forth in the following claims.

What is claimed is:

1. A level indicator for a container for two fluids in contact of different specific gravities and different electrical resistivities, comprising in combination two spaced electrodes normally immersed in said fluids respectively motor means to raise and lower the electrodes, a bridge circuit containing said electrodes as one resistance, means supplying current to opposite ends of the bridge, vacuum tube relay means actuated by unbalance of said bridge actuating said motor means to move said electrodes to restore the balance of said bridge, and means biasing said vacuum tube relay means to make the relay lag in operation and avoid hunting.

2. The combination of claim 1 in which the motor means comprises a shading coil reversible motor, said relay shorting the proper shading coil of said motor to actuate said motor in the proper direction.

CARY R. WAGNER.

REFERENCES CITED

The following references are of record in the file of this patent:

UNITED STATES PATENTS

| Number | Name | Date |
|---|---|---|
| 2,032,016 | Hitner | Feb. 25, 1936 |
| 2,104,525 | Proskouriakoff | Jan. 4, 1938 |
| 2,116,636 | Neumann | May 10, 1938 |
| 2,354,945 | Cohen et al. | Aug. 1, 1944 |
| 2,366,694 | Bender | Jan. 9, 1945 |
| 2,376,459 | Stevens | May 22, 1945 |
| 2,376,878 | Lehnhard | May 29, 1945 |
| 2,382,516 | Sprague | Aug. 14, 1945 |

FOREIGN PATENTS

| Number | Country | Date |
|---|---|---|
| 308,939 | Germany | Sept. 2, 1917 |
| 435,441 | Great Britain | Sept. 20, 1935 |